United States Patent
Watanabe et al.

(10) Patent No.: US 9,342,771 B2
(45) Date of Patent: May 17, 2016

(54) PRINTER WITH DISPLAY UNIT FOR DISPLAYING PAPER REGISTRATION SCREEN AND STORING UNIT FOR STORING ATTRIBUTE OF PAPER ASSOCIATED WITH PAPER FEEDING UNIT

(71) Applicant: SEIKO EPSON CORPORATION, Tokyo (JP)

(72) Inventors: Ikumi Watanabe, Nagano (JP); Akemi Ito, Nagano (JP); Reiko Nomura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/197,303

(22) Filed: Mar. 5, 2014

(65) Prior Publication Data

US 2014/0285842 A1   Sep. 25, 2014

(30) Foreign Application Priority Data

Mar. 25, 2013   (JP) .................................. 2013-061563

(51) Int. Cl.
*G06F 15/00* (2006.01)
*G03G 15/00* (2006.01)
*G06K 15/00* (2006.01)

(52) U.S. Cl.
CPC .......... *G06K 15/4065* (2013.01); *G06K 15/005* (2013.01)

(58) Field of Classification Search
CPC .......... G03G 2215/00725; G03G 2215/00751; G03G 15/6502; G03G 15/6508
USPC ............ 358/1.9, 1.13, 1.15, 1.16; 399/16, 23, 399/24, 195
See application file for complete search history.

(56) References Cited

U.S. PATENT DOCUMENTS

| | | | | |
|---|---|---|---|---|
| 5,999,765 | A * | 12/1999 | Tomita | G03G 15/6588 399/45 |
| 2001/0007619 | A1 * | 7/2001 | Kakutani | 400/582 |
| 2001/0028808 | A1 * | 10/2001 | Nomura et al. | 399/81 |
| 2008/0175616 | A1 * | 7/2008 | Nishida | G03G 15/5087 399/81 |
| 2011/0164276 | A1 * | 7/2011 | Hata | 358/1.15 |

FOREIGN PATENT DOCUMENTS

JP   2002-278377 A   9/2002

* cited by examiner

*Primary Examiner* — Thomas Lett
(74) *Attorney, Agent, or Firm* — Global IP Counselors, LLP

(57) ABSTRACT

A printer includes a display unit, a printing unit and a printing control unit. The display unit is configured and arranged to display a paper registration screen for registering or confirming attributes of paper held in a paper feeding unit when display conditions have been satisfied. The printing unit is configured and arranged to execute printing. The printing control unit is configured to, when prescribed printing start conditions are satisfied during a period in which the paper registration screen is being displayed, control the printing unit to start printing job using the attributes registered before display of the paper registration screen as the attributes of the paper held in the paper feeding unit used with the printing job.

7 Claims, 2 Drawing Sheets

PRINTER WITH DISPLAY UNIT FOR DISPLAYING PAPER REGISTRATION SCREEN AND STORING UNIT FOR STORING ATTRIBUTE OF PAPER ASSOCIATED WITH PAPER FEEDING UNIT

CROSS-REFERENCE TO RELATED APPLICATIONS

This application claims priority to Japanese Patent Application No. 2013-061563 filed on Mar. 25, 2013. The entire disclosure of Japanese Patent Application No. 2013-061563 is hereby incorporated herein by reference.

BACKGROUND

1. Technical Field

The present invention relates to a printer.

2. Related Art

From the past, printers are known for which when a paper feeding cassette is inserted or removed, a paper registration screen is displayed for guiding or changing the registration contents for the paper housed in that cassette (for example, see Japanese Unexamined Patent Publication No. 2002-278377).

SUMMARY

However, in the past, technology was not known for which, when a printing job was generated in a state with that kind of paper registration screen displayed, the printing would start even when an operation to end that screen display was not performed. With the conventional technology for which printing does not start in any case until an operation is performed to end the paper registration screen, a state arose in which printing was unnecessarily delayed, and the user was unnecessarily forced to input paper attributes.

A printer according to one aspect includes a display unit, a printing unit and a printing control unit. The display unit is configured and arranged to display a paper registration screen for registering or confirming attributes of paper held in a paper feeding unit when display conditions have been satisfied. The printing unit is configured and arranged to execute printing. The printing control unit is configured to, when prescribed printing start conditions are satisfied during a period in which the paper registration screen is being displayed, control the printing unit to start printing job using the attributes registered before display of the paper registration screen as the attributes of the paper held in the paper feeding unit used with the printing job.

With the present invention, when a printing job is generated in a state with the paper registration screen displayed, it is possible to start printing even without performing an operation of ending the screen display.

BRIEF DESCRIPTION OF THE DRAWINGS

Referring now to the attached drawings which form a part of this original disclosure.

DETAILED DESCRIPTION OF EXEMPLARY EMBODIMENTS

Following, we will describe modes of carrying out the invention while referring to the attached drawings. Note that for corresponding constitutional elements in each drawing, the same code numbers are given, and redundant descriptions will be omitted.

1. Printer Summary

Figure 1A:
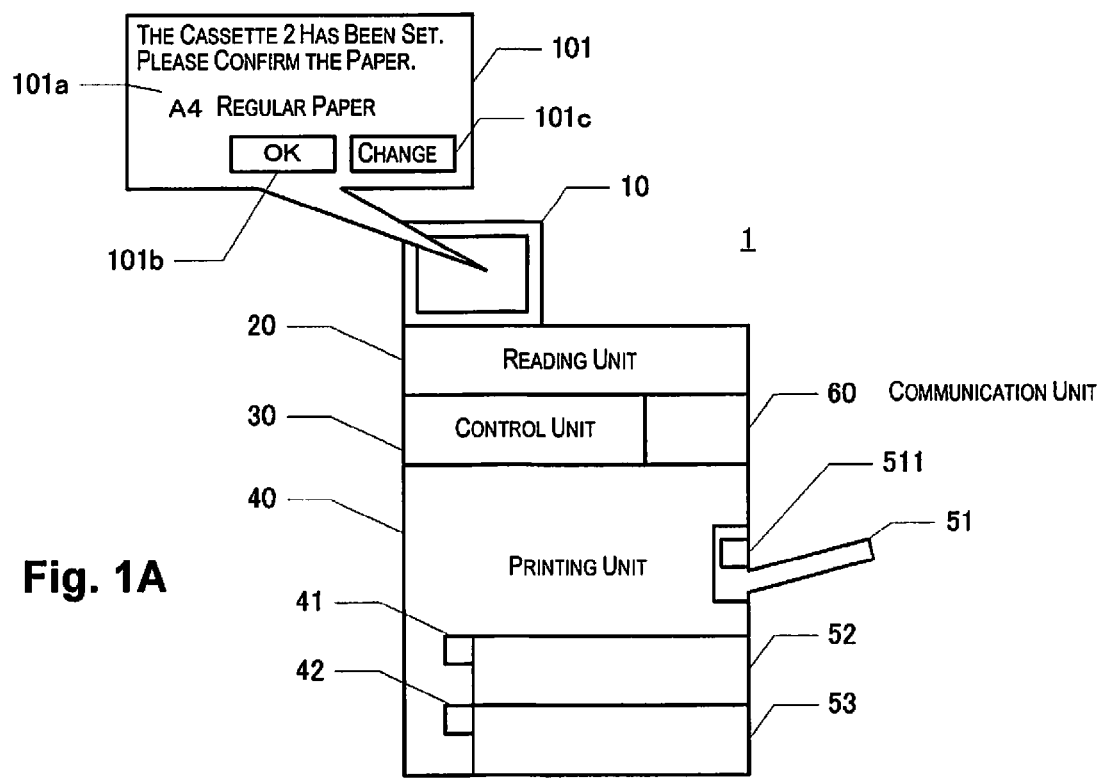
FIG. 1A is a block diagram of an embodiment of the present invention.

FIG. 1 shows a printer 1 as an embodiment of the present invention. The printer 1 is a compound machine equipped with a function for executing printing according to requests from an external device such as a PC or the like, a fax sending and receiving function, and a copying function, and is equipped with a display unit 10, a reading unit 20, a control unit 30, a communication unit 60, a printing unit 40, and paper feeding units 51, 52, and 53. The display unit 10 is a user interface for operating the printer 1, and is equipped with a touch panel. The reading unit 20 is a well known scanner for outputting to the control unit 30 the image data read from the original copy. The printing unit 40 is a mechanism for forming an image on paper using a well known inkjet method, laser method or the like. The communication unit 60 is a mechanism for communication with an external device via a LAN (Local Area Network), telephone line, the internet or the like in compliance with a well known communication standard. The paper feeding units 51, 52, and 53 are mechanisms which each hold paper, and supply paper to the printing unit 40.

The paper feeding unit 51 is a well known multipurpose tray which is fixed to the printing unit 40 without being able to be inserted or removed. The multipurpose tray 51 is equipped with a sensor 511 for detecting whether or not paper is placed in the multipurpose tray 51. The multipurpose tray 51 has the surface for placing paper exposed, and is provided with a sliding type guide for holding paper of various sizes in the multipurpose tray 51.

The paper feeding units 52 and 53 are well known paper feeding cassettes that can be inserted in and removed from the printing unit 40. The paper feeding cassettes 52 and 53 can be stored in the storage chamber provided in the printing unit 40, and this has a box shape in which paper can be placed. Sliding type guides for holding paper of different sizes are also provided inside the paper feeding cassettes 52 and 53. The printing unit 40 is equipped with sensors 41 and 42 for detecting the insertion state and the removal state of the paper feeding cassettes 52 and 53 in the printing unit 40.

The control unit 30 is equipped with items that are not illustrated including a CPU, memory, an input/output mechanism, a non-volatile storage medium, an image processing ASIC (Application Specific Integrated Circuit) and the like, and the display unit 10, the reading unit 20, the communication unit 60, the printing unit 40, and the paper feeding units 51, 52, and 53 are controlled by executing the control program stored in the non-volatile storage medium, realizing functions such as printing, sending and receiving faxes, image reading, the user interface and the like.

2. Printer Control Method

Figure 2:
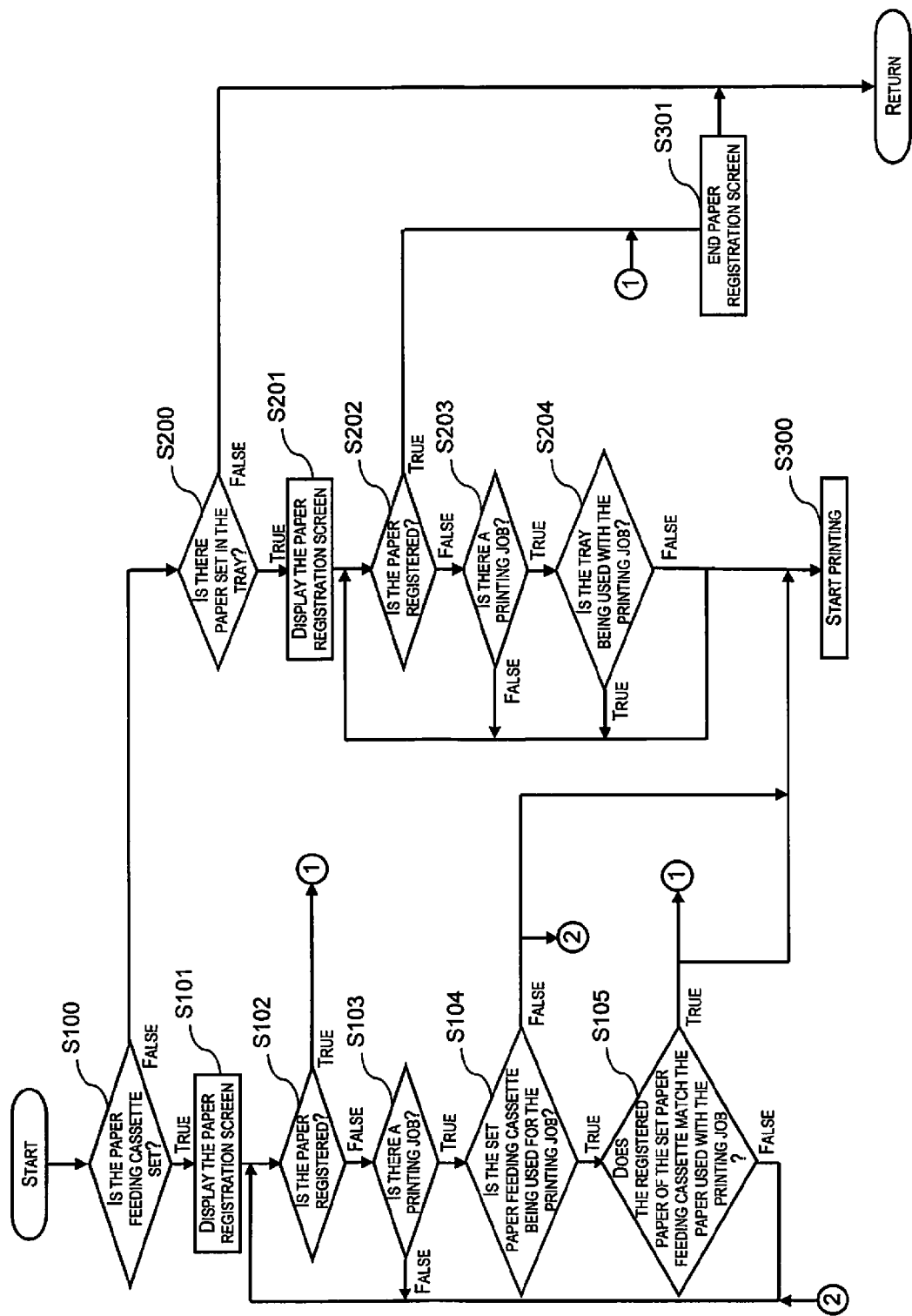
FIG. 2 is a flow chart of the embodiment of the present invention.

FIG. 2 shows the printer 1 control sequence for exchanging and refilling paper.

First, the control unit 30 determines whether one of the paper feeding cassettes 52 and 53 is inserted in the printing unit 40 (S100), or whether paper is placed in the multipurpose tray 51 (S200). First we will describe the control sequence when one of the paper feeding cassettes 52 or 53 is inserted in the printing unit 40, and next we will describe the control sequence when paper is placed in the multipurpose tray 51.

Figure 1B:
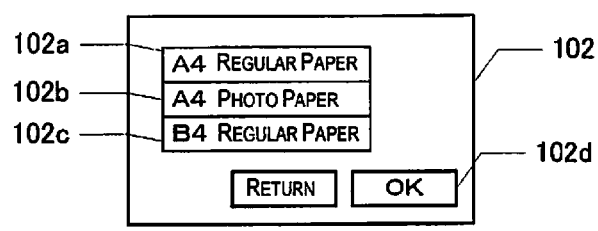
FIG. 1B is a screen configuration diagram of the embodiment of the present invention.

When one or the other of the paper feeding cassettes 52 or 53 is inserted in the printing unit 40, the control unit 30 displays, for example, the paper registration screen 101 shown in FIG. 1 on the display unit 10 (S101). The paper registration screen 101 is displayed associated with one or the other paper feeding unit, and the screen is for a user to register the attributes of the paper held in the associated paper feeding unit. When OK button 101*b* is selected, the control unit 30 stores paper attributes 101*a* consisting of the size and paper quality of the paper displayed at that time in a nonvolatile storage medium as attributes of the paper held by the paper feeding unit associated with the paper registration screen 101. When change button 101*c* is selected, the control unit 30 displays, for example, the paper registration screen 102 shown in FIG. 1B on the display unit 10, and has the user select paper attributes 102*a*, 102*b*, or 102*c*. When OK button 102*d* is selected with the paper registration screen 102, the control unit 30 stores in the nonvolatile storage means the paper attributes 102*a*, 102*b*, and 102*c* selected as the attributes of the paper held by the corresponding paper feeding unit.

The control unit determines whether the paper attributes have been registered or confirmed, specifically, determines whether either of the OK button 101*b* or the OK button 102*d* has been selected (S102), and when the paper attributes are registered, ends display of the paper registration screen 101 and 102 (S301).

When paper attributes have not been registered or confirmed, the control unit 30 determines whether or not a printing job exists (S103). When a printing job does not exist, the control unit 30 repeats the process of steps S102 and S103 until a printing job is generated with the paper registration screen 101 and 102 still displayed.

When it is determined that a printing job exists during the period when the paper registration screen 101 and 102 are displayed, cases of a printing job being generated during the period that the paper registration screens 101 and 102 are displayed, and cases of the printing job generated before display of the paper registration screen 101 being discontinued due to removal of the paper feeding cassettes 52 and 53 are both included. When the printing job generated before display of the paper registration screen 101 is discontinued due to removal of the paper feeding cassettes 52 and 53, and it is possible to restart by insertion of the paper feeding cassettes 52 and 53, after the paper runs out midway during execution of printing job, the probability of the paper being refilled by the user who is the owner of the printing job is high. Specifically, in this case, the attributes of the paper held in the paper feeding cassettes 52 and 53 used with the printing job are regarded as matching those before the paper registration screen display. Therefore, in this case, it is possible to start printing immediately as the printing start conditions being satisfied, and furthermore, to start printing without display of the paper registration screen. However, with this embodiment, a judgment is further made as described below of whether or not the printing start conditions and the screen display end conditions have been satisfied.

When it is determined that a printing job exists, the control unit 30 determines whether or not the inserted paper feeding cassettes 52 and 53 are used for the printing job (S104). Specifically, a determination is made of whether the paper feeding units 52 and 53 which caused display of the paper registration screen 101 by being inserted match the paper feeding units 51, 52, and 53 used for the printing job. With the paper feeding units 51, 52, and 53 used with the printing job, there are cases when they are explicitly specified by the user who is the owner of the printing job, and cases when the user specifies for the paper feeding units 51, 52, and 53 used with the printing job to be automatically selected.

When the paper feeding units 51, 52, and 53 are automatically selected, the control unit 30 selects the paper feeding unit 51, 52, or 53 for which paper attributes consistent with the paper attributes set with the printing job are registered. The paper attributes consistent with the paper attributes set with the printing job include paper attributes that match the paper attributes set with the printing job, and paper attributes allowed by the printing job. For example, in a case when the paper size set with the printing job is A5, and A5 size paper is not registered in any of paper feeding units 51, 52, or 53, paper of a size of A5 or greater in which the printing subject image will fit is allowed. Also, for example, in a case when the paper quality set with the printing job is photo paper, and when photo paper is not registered in any of the paper feeding units 51, 52, or 53, any quality of paper such as regular paper, recycled paper or the like is allowed.

When the paper feeding cassettes 52 and 53 which caused the paper registration screen 101 to be displayed do not match the paper feeding cassettes 52 and 53 being used with the printing job, this means that the paper feeding cassettes 52 and 53 being used with the printing job have not been inserted or removed, so this can be regarded as the attributes of the paper held in the paper feeding cassettes 52 and 53 used with the printing job as matching those before display of the paper registration screen 101.

In light of that, when the inserted paper feeding cassettes 52 and 53 are not used with the printing job, the control unit 30 executes the printing job regarding the printing start conditions as being fulfilled, and has the printing unit 40 start printing (S300). However, in this case, the control unit 30 continues displaying the paper registration screen 101 and 102 corresponding to the inserted paper feeding cassettes 52 and 53 (S102). Because of this, the user who inserted the paper feeding cassettes 52 and 53 not being used with the printing job can register the paper attributes using the paper registration screen 101 and 102.

When the inserted paper feeding cassettes 52 and 53 are used with the printing job, the control unit 30 determines whether or not the paper attributes registered with the inserted paper feeding cassettes 52 and 53 match the paper attributes set with the printing job (S105).

The paper attributes registered for the inserted paper feeding cassettes 52 and 53 are the items registered before the paper registration screens 101 and 102 are displayed, not the items registered after the paper feeding cassettes 52 and 53 are inserted. Therefore, the paper attributes registered for the inserted paper feeding cassettes 52 and 53 may be different from the attributes of the paper held in the paper feeding cassettes 52 and 53. However, in contrast to the multipurpose tray 51, the paper feeding cassettes 52 and 53 are used to stock large volumes of regularly used paper, so the possibility of their insertion or removal being performed with the goal of refilling the same paper rather than exchanging it is very high. Therefore, for the paper feeding cassettes 52 and 53, the attributes of the paper held by these before and after insertion and removal are regarded as not having changed, and it is preferable that the user omit the paper attributes registration operation. If anything, having to register the paper attributes each time the same paper is refilled is troublesome for the user.

However, when we consider a case when the paper attributes registered for the inserted paper feeding cassettes 52 and 53 and the paper attributes set with the printing job do not match, in this state, the possibility that the user who is the owner of the printing job explicitly specified the paper feeding cassettes 52 and 53 is high. This is because when specified by automatic selection, paper is set for the printing job having attributes at least consistent with the attributes of the paper registered for the paper feeding cassettes 52 and 53. Then, setting for the printing job the use of the inserted paper feeding cassettes 52 and 53 regardless of the registered paper attributes being different from the paper attributes set for the printing job gives a high possibility of the user himself who is the owner of that printing job having exchanged the paper of the paper feeding cassettes 52 and 53 with paper with different attributes. In such a case, it is necessary to register new paper attributes, so it is preferable to continue display of the paper registration screen until the paper attributes are registered.

In light of that, when the paper attributes registered for the inserted paper feeding cassettes 52 and 53 match the paper attributes set with the printing job, the control unit 30 regards that as the printing start conditions and display end conditions having been satisfied, and executes the printing job to start printing (S300) as well as end display of the paper registration screens 101 and 102 (S301). Meanwhile, when the paper attributes registered for the inserted paper feeding cassettes 52 and 53 do not match the paper attributes set with the printing job, this is regarded as the printing start conditions and display end conditions as not being satisfied, and the control unit 30 continues the display of the paper registration screens 101 and 102 corresponding to the inserted paper feeding cassettes 52 and 53 (S102). As a result, it is possible to have the user who inserted the paper feeding cassettes 52 and 53 register the paper attributes using the paper registration screens 101 and 102.

Next, we will describe the control sequence when paper is placed in the multipurpose tray 51. The paper registration screen is displayed (S201), and if paper attributes are registered, the paper registration screen display is ended (S301), and for the process of determining whether there is a printing job during display of the paper registration screen (S203), this is the same as the control sequence when the paper feeding cassettes 52 and 53 are inserted.

When it is determined that there is a printing job during display of the paper registration screen, the control unit 30 determines whether or not the multipurpose tray 51 is used with that printing job (S204). This determination process corresponds to the process of determining whether or not the inserted paper feeding cassettes 52 and 53 are used with the printing job when the paper feeding cassettes 52 and 53 are inserted. Specifically, with either process, this is a process of determining whether or not the printing start conditions and the display end conditions have been satisfied based on whether or not a first paper feeding unit which caused the paper registration screen to be displayed is different from a second paper feeding unit used for the printing job.

When the multipurpose tray 51 is not used with the printing job, the same as with the control sequence when the paper feeding cassettes 52 and 53 are inserted, the control unit 30 executes the printing job and starts printing (S300), and also continues display of the paper registration screen (S202).

Meanwhile, when the multipurpose tray 51 is used with the printing job, in contrast to the control sequence when the paper feeding cassettes 52 and 53 are inserted, the control unit 30 does not start printing, and does not end display of the paper registration screen, but rather continues display of the paper registration screen until the paper attributes are registered (S202). This is because in the case of the multipurpose tray 51, for the sensor 511 to respond when switched from a state without paper placed to a state with it placed in the multipurpose tray 51, there is a high possibility that the paper registered before display of the paper registration screen has been exchanged with different paper.

As described above, even in a case when inserting and removing the paper feeding cassettes 52 and 53 or when performing paper exchange or refilling of the multipurpose tray 51, printing starts when the prescribed printing start conditions have been satisfied, so it is possible to prevent the problem of delaying printing unnecessarily. Also, when the prescribed display end conditions have been satisfied, display of the paper registration screen is ended, so it is possible to prevent the problem of the user being forced to input the paper attributes unnecessarily.

3. Other Embodiments

Moreover, the technical scope of the present invention is not limited by the embodiments described above, and of course it is possible to add various changes within a scope that does not stray from the gist of the present invention.

For example, it possible to suitably change to what level of detail the paper attributes are classified. For example, it is also possible to add thickness in addition to the paper size and paper quality as a paper attribute classification item, and conversely, it is possible to have only size as the paper attribute classification item. Also, with the embodiment noted above, the insertion of the paper feeding cassette was the trigger for display of the paper registration screen, but it is also possible to have removal of the paper feeding cassette as the trigger for display of the paper registration screen.

Also, with this embodiment, we used the matching of the paper attributes registered before display of the paper registration screen with the paper attributes set with the printing job as the printing start condition and the display end condition, but it is also possible to use the paper attributes registered before display of the paper registration screen being allowed as the paper attributes used with the printing job as the printing start condition and the display end condition.

Also, combinations of conditions for starting printing, and combinations of conditions for ending display of the paper registration screens are not limited to the embodiment noted above, and it is also possible to remove a part of the conditions or add conditions in a scope for which the paper attributes held in the paper feeding unit used for the printing job are regarded as matching those before the display of the paper registration screen. For example, when considering a case of when the paper attributes registered with the inserted paper feeding cassettes 52 and 53 do not match the paper attributes set with the printing job, as has already been described, in this state, the user himself who is the owner of that printing job has a high possibility of replacing the paper of the paper feeding cassettes 52 and 53 with paper of different attributes. This also means there is a high possibility that the user himself knows the attributes of the paper actually held in the paper feeding cassettes 52 and 53. Specifically, it is possible that the user may have requested printing after switching the paper in the paper feeding cassettes 52 and 53 to paper he is going to use, and before registering the paper attributes. Therefore, even when the paper attributes registered for the inserted paper feeding cassettes 52 and 53 do not match the paper attributes set with the printing job, the control unit 30 executes the printing job and can use the control sequence for starting printing. However, in this case, as has already been described, it is necessary to register the attributes of the paper after switching, so it is preferable to continue display of the paper registration screen.

Also, with this embodiment, a determination was made each time of whether or not the printing start conditions and the display end conditions are satisfied, but for example, with a printer equipped with only a paper feeding cassette as the paper feeding unit, it is also possible to start printing without determining the conditions when there is a printing job during display of the paper registration screen.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printer comprising:
a plurality of paper feeding units including first and second paper feeding units;
a display that displays a paper registration screen for registering attributes of paper that are associated with the paper feeding units;
a printing mechanism that executes printing based on a printing job;
a memory that stores the attributes of the paper that include a first attribute of paper associated with the first paper feeding unit and a second attribute of paper associated with the second paper feeding unit; and
a controller that controls the printing mechanism to commence and execute the printing,
when the attributes of the paper that are associated with the paper feeding units are confirmed, the controller storing in the memory the attributes of the paper that have been confirmed,
the controller further controlling the printing mechanism to commence the printing, in a state where the paper registration screen for changing the first attribute of the paper is being displayed, by using the second attribute of the paper associated with the second paper feeding unit that is used for the printing job, when printing start conditions for using the second paper feeding unit are satisfied during a period in which the paper registration screen for changing the first attribute of the paper is being displayed,
the display further continuing displaying the paper registration screen for changing the first attribute of the paper after the printing on the paper held in the second paper feeding unit by using the second attribute of paper has been completed, such that when the first attribute of the paper is changed to a third attribute of paper, the memory stores the third attribute of the paper that has been changed.

2. The printer according to claim 1, wherein
the printing start conditions include the first paper feeding unit which has caused the paper registration screen to be displayed being different from the second paper feeding unit used for the printing job.

3. The printer according to claim 1, wherein
when display end conditions are satisfied, the display ends display of the paper registration screen, and
the display end conditions include the first paper feeding unit which has caused the paper registration screen to be displayed matching the second paper feeding unit used for the printing job.

4. The printer according to claim 3, wherein
when the first paper feeding unit which has caused the paper registration screen to be displayed does not match the second paper feeding unit which is used with the printing job generated, the display continues displaying the screen.

5. The printer according to claim 1, wherein
the controller further determines whether or not the first paper feeding section, which has caused the paper registration screen to be displayed in response to supply of the paper in the first paper feeding section, matches the second paper feeding section that is designated for the print job, and
the printing start conditions include a condition where the controller determines the first paper feeding section does not match the second paper feeding section.

6. A printer comprising:
a plurality of paper feeding units including first and second paper feeding units each of which is one of a paper feeding cassette and a multipurpose tray;
a display that displays a paper registration screen for registering attributes of paper that are associated with the paper feeding units;
a printing mechanism that executes printing based on a printing job;
a memory that stores the attributes of the paper that include a first attribute of paper associated with the first paper feeding unit and a second attribute of paper associated with the second paper feeding unit; and
a controller that controls the printing mechanism to commence and execute the printing,
when the attributes of the paper that are associated with the paper feeding units are confirmed, the controller storing in the memory the attributes of the paper that have been confirmed,
the controller further controlling the printing mechanism to commence the printing, in a state where the paper registration screen for changing the first attribute of the paper is being displayed, by using the second attribute of the paper associated with the second paper feeding unit that is used for the printing job, when printing start conditions for using the second paper feeding unit are satisfied during a period in which the paper registration screen for changing the first attribute of the paper is being displayed, the display further continuing displaying the paper registration screen for changing the first attribute of the paper after the printing on the paper held in the second paper feeding unit by using the second attribute of paper has been completed, such that when the first attribute of the paper is changed to a third attribute of paper, the memory stores the third attribute of the paper that has been changed.

7. A controller for storing in a memory attributes of paper associated with a plurality of paper feeding units including first and second paper feeding units, the attributes of the paper including a first attribute of paper associated with the first paper feeding unit and a second attribute of paper associated with the second paper feeding unit, the controller further controlling a printing mechanism to commence and execute printing based on a printing job and display a paper registration screen for registering the attributes of paper at a display, when the attributes of the paper that are associated with the paper feeding units are confirmed, the controller storing in the memory the attributes of the paper that have been confirmed, the controller controlling the printing mechanism to commence the printing, in a state where the paper registration screen for changing the first attribute of the paper is being displayed, by using the second attribute of the paper associated with the second paper feeding unit that is used for the printing job, when printing start conditions for using the second paper feeding unit are satisfied during a period in which the paper registration screen for changing the first attribute of the paper is being displayed, the controller further controlling the display to continue displaying the paper registration screen for changing the first attribute of the paper after the printing on the paper held in the second paper feeding unit by using the second attribute of paper has been completed so as to, when the first attribute of the paper is changed to a third attribute of paper, store in the memory the third attribute of the paper that has been changed.

\* \* \* \* \*